United States Patent
Kawanishi

(10) Patent No.: US 10,340,672 B2
(45) Date of Patent: Jul. 2, 2019

(54) CONDUCTING WIRE END PORTION JOINING METHOD, AND CONDUCTING WIRE END PORTION JOINING STRUCTURE

(71) Applicant: TOYOTA JIDOSHA KABUSHIKI KAISHA, Toyota-shi, Aichi-ken (JP)

(72) Inventor: Yoshitomo Kawanishi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 176 days.

(21) Appl. No.: 15/224,980

(22) Filed: Aug. 1, 2016

(65) Prior Publication Data
US 2017/0040784 A1   Feb. 9, 2017

(30) Foreign Application Priority Data
Aug. 6, 2015 (JP) ................................. 2015-156369

(51) Int. Cl.
| | |
|---|---|
| H01R 43/00 | (2006.01) |
| H02G 1/14 | (2006.01) |
| H01B 1/02 | (2006.01) |
| H01R 4/22 | (2006.01) |
| H02G 15/04 | (2006.01) |

(52) U.S. Cl.
CPC ............... *H02G 1/14* (2013.01); *H01B 1/026* (2013.01); *H01R 4/22* (2013.01); *H02G 15/043* (2013.01)

(58) Field of Classification Search
CPC ........ H02G 1/14; H02G 15/043; H01B 1/026; H01R 4/22
See application file for complete search history.

(56) References Cited

U.S. PATENT DOCUMENTS

| | | | | |
|---|---|---|---|---|
| 6,501,206 B2 * | 12/2002 | Oohashi | ................... | H02K 3/28 310/180 |
| 6,951,491 B2 * | 10/2005 | Sakaguchi | ............... | H01R 4/20 439/760 |
| 7,850,806 B2 * | 12/2010 | Kawakita | ................. | H01R 4/72 156/47 |
| 2006/0048965 A1 * | 3/2006 | Ootsuki | ................... | H01R 4/22 174/74 A |
| 2010/0282486 A1 * | 11/2010 | Shin | ........................ | H01R 4/72 174/85 |
| 2013/0099620 A1 | 4/2013 | Takasaki et al. | | |

FOREIGN PATENT DOCUMENTS

| | | |
|---|---|---|
| JP | 6225845 A | 2/1987 |
| JP | 2007-299933 A | 11/2007 |
| JP | 2009054550 A | 3/2009 |
| JP | 2013-093968 A | 5/2013 |

* cited by examiner

*Primary Examiner* — Paul D Kim
(74) *Attorney, Agent, or Firm* — Sughrue Mion, PLLC

(57) ABSTRACT

A conducting wire end portion joining method is a method for conductively joining together end portions of conducting wires each covered with an insulation coating. The conducting wire end portion joining method includes: adjoining end portions of two winding wires, and bringing the end portions of the conducting wires of the two winding wires into contact with a conductive coating material stored in an insulating cap having a property of shrinking when heated; and shrinking the insulating cap by heating to fix the shrunken insulating cap around the insulation coatings of the end portions of the two winding wires, and joining together the end portions of the two winding wires by conductively connecting the conducting wires of the two winding wires via the hardened conductive coating material.

16 Claims, 4 Drawing Sheets

CONDUCTING WIRE END PORTION JOINING METHOD, AND CONDUCTING WIRE END PORTION JOINING STRUCTURE

INCORPORATION BY REFERENCE

The disclosure of Japanese Patent Application No. 2015-156369 filed on Aug. 6, 2015 including the specification, drawings and abstract is incorporated herein by reference in its entirety.

BACKGROUND OF THE INVENTION

1. Field of the Invention

The invention relates to a conducting wire end portion joining method for conductively joining together end portions of conducting wires each made of a flat wire or the like. The invention relates also to a conducting wire end portion joining structure in which end portions of conducting wires are conductively joined together.

2. Description of Related Art

A stator of a motor includes a stator core made of laminated steel sheets each having an annular yoke, a plurality of teeth protruding radially inward from the yoke, and slots defined between the teeth that are adjacent to each other. The stator is formed by winding coils around the teeth while inserting the coils into the slots.

In winding wires for the coils, insulation coatings are formed around the conducting wires. Thus, insulation between the conducting wires in the coils is provided. Further, insulation between the stator core and the coils is provided by an insulator, such as an insulating bobbin or insulating paper, disposed between the teeth and the coils. Moreover, when, for example, distributed winding is employed as a winding configuration, phase-to-phase insulation between different phase coils is provided by an insulator, such as insulating paper.

A winding wire for forming a coil according to related art is manufactured as follows. A conducting wire made of, for example, a copper material is coated with a thermosetting enamel resin dissolved in a solvent, such that a coating layer having a thickness of several μm is formed around the conducting wire. Then, the coating layer is hardened by heat treatment. This process is repeated several times to form an enamel coating having a desired thickness. As the material of this enamel coating, an amide-imide resin, a urethane resin, an ester-imide resin, a polyimide resin, an oxide film, or the like is typically used. As the winding wire, a winding wire with a circular cross-section or a flat wire that is able to increase the coil space factor may be used.

As an actual method for forming coils around the teeth, the following method is employed. First, coils formed by winding conducting wires are fitted around the teeth. Then, end portions of the adjacent coils (winding wires) are connected to each other at coil ends by welding to form a continuous body of coils.

A method for conductively joining together end portions of coils (winding wires) according to related art will be briefly described with reference to FIGS. 4A to 4E.

First, as shown in FIGS. 4A and 4B, end portions Ma of winding wires M (flat wires) are brought into contact with each other. Each winding wire M includes a conducting wire W having a rectangular cross-sectional shape, and an insulation coating Z formed around the conducting wire W. Then, the insulation coatings Z on both of the end portions are stripped off to expose the conducting wires W of the end portions, as shown in FIG. 4C.

Next, the end portions of the conducting wires W are welded together by, for example, tungsten inert gas welding (TIG welding) having a welding temperature of approximately 500° C. Thus, the end portions of the conducting wires W are conductively joined together at a weld zone Y, as shown in FIG. 4D.

Finally, as shown in FIG. 4E, the conducting wires W of the end portions and the weld zone Y are coated with epoxy resin powder or the like to form an insulation coating Z'. In this way, the end portions of the winding wires are joined together to form a winding wire end portion joining structure S. It is necessary to strip off the insulation coatings Z as shown in FIG. 4C, for the following reason. If the insulation coatings Z are left on the end portions, the insulation coatings Z will carbonize because the welding temperature of welding is a high temperature of approximately 500° C. As a result, the carbonized insulation coatings Z are not appropriately connected to weld metal and the insulation coating Z' that is ultimately formed.

Japanese Patent Application Publication No. 2013-93968 (JP 2013-93968 A) also describes a conducting wire end portion joining method. According to this method, in order to join end portions of winding wires together, first, insulation coatings of the end portions of the winding wires are stripped off to expose conducting wires, then the conducting wires are conductively connected together by welding, and then the conducting wires of the end portions and a weld zone are coated with insulating resin powder such that they are covered with the insulating resin powder.

The conducting wire end portion joining method according to the above-described related art requires three processes, that is, a process of stripping off the insulation coatings of the end portions of the conducting wires to be joined together, a welding process, and a process of forming an insulation coating at a joint portion at which the end portions are joined together. Thus, the method requires a lot of manufacturing time and laborious work.

Furthermore, as is also evident from FIG. 4E, the weld zone Y is formed at distal ends of the conducting wires W of the end portions of the winding wires M, and the insulation coating Z' is formed such that the weld zone Y is covered with the insulation coating Z'. Thus, a height t1 of the joint portion, at which the conducting wires W are joined together, inevitably becomes high. Because the height of the joint portion at the coil ends becomes high, the physical size of the coils becomes large.

SUMMARY OF THE INVENTION

The invention provides a conducting wire end portion joining method that makes it possible to join together end portions of conducting wires in fewer processes while making it possible to form a conducting wire end portion joining structure having a lower height, and the invention provides also a conducting wire end portion joining structure having a lower height.

A first aspect of the invention relates to a conducting wire end portion joining method for conductively joining together end portions of conducting wires each covered with an insulation coating. The conducting wire end portion joining method includes: adjoining end portions of two winding wires, and bringing the end portions of the conducting wires of the two winding wires into contact with a conductive coating material stored in an insulating cap having a property of shrinking when heated; and shrinking the insulating cap by heating to fix the shrunken insulating cap around the insulation coatings of the end portions of the two winding wires, and joining together the end portions of the two winding wires by conductively connecting the conducting wires of the two winding wires via the hardened conductive coating material.

The conducting wire end portion joining method according to the first aspect of the invention eliminates a process of stripping off the insulation coatings on the end portions of the winding wires and a welding process. With the conducting wire end portion joining method according to the first aspect, the end portions of the two conducting wires are brought into contact, as they are, with the conductive coating material stored in the insulating cap, then the insulating cap is shrunk by heating, and the end portions of the two conducting wires are conductively joined together by hardening the conductive coating material. The term "contact" here may refer to a state where the end portions of the conducting wires (the end portion of each conducting wire includes the end surface of the conducing wire and the side surfaces near the end surface) are dipped or immersed in the conductive coating material, or a state where only the end surfaces of the conducting wires are in contact with the conductive coating material. The conducting wire end portion joining method according to the related art requires three different processes, that is, a process of stripping off coatings of end portions of winding wires, a welding process, and a process of forming an insulation coating. In contrast to this, according to the conducting wire end portion joining method in the first aspect, the end portions of the conducting wires are joined together through a single continuous process in which the end portions of the conducting wires are brought into contact with the conductive coating material and heating is performed. Thus, the number of processes is significantly reduced as compared with the conducting wire end portion joining method according to the related art.

A conducting wire end portion joining structure according to the related art is formed by stripping off the coatings on the end portions of the winding wires to expose the conducting wires, forming a weld zone at the distal ends of the conducting wires, and forming an insulation coating around the end portions of the conducting wires and the weld zone. In contrast to this, according to the first aspect, a conducting wire end portion joining structure is formed by bringing the end portions of the two conducting wires into contact with the conductive coating material, and then hardening the conductive coating material. Thus, the height of the conducting wire end portion joining structure formed by the conducting wire end portion joining method according to the first aspect is significantly lower than that of the conducting wire end portion joining structure according to the related art. As a result, the height of a joint portion at the coil ends is also lower, and consequently, the physical size of the coils is smaller than that of the conducting wire end portion joining structure according to the related art.

The winding wire may be a round wire having a circular cross-section or a flat wire having a rectangular cross-section. However, a flat wire that is able to increase the coil space factor is preferably used.

The conducting wires may be made of, for example, oxygen-free copper or tough-pitch copper.

Because the conducting wires are made of copper, one of a copper paste (in which copper is dispersed in a thermosetting resin) and a silver paste (in which silver is dispersed in a thermosetting resin) each having an electrical resistance close to that of copper may be used as the conductive coating material in order to prevent heat loss at the joint portion.

The insulating cap may be made of, for example, fluorinated ethylene propylene (FEP) that is a copolymer of tetrafluoroethylene and hexafluoropropylene, or made of polytetrafluoroethylene (PTFE). FEP and PTFE are highly heat resistant fluororesins.

The insulating cap shrinks when heated, and is thus fixed in close contact with the insulation coatings of the end portions of the conducting wires.

A second aspect of the invention relates to a conducting wire end portion joining structure including two winding wires and an insulating cap. In the conducting wire end portion joining structure, end portions of conducting wires of the two winding wires are conductively joined together. Each of the conducting wires is covered with an insulation coating. The end portions of the conducting wires of the two winding wires are in contact with a conductive coating material in the insulating cap, and the conducting wires of the two winding wires are conductively connected together via the conductive coating material. Further, the insulating cap is fixed around the insulation coatings of the end portions of the two winding wires.

The height of the conducting wire end portion joining structure according to the second aspect is significantly lower than that of the conducting wire end portion joining structure according to the related art. As a result, the height of a joint portion at the coil ends is also lower, and consequently, the physical size of the coils is smaller than that of the conducting wire end portion joining structure according to the related art.

As can be understood from the foregoing description, in the conducting wire end portion joining method according to the first aspect of the invention and the conducting wire end portion joining structure according to the second aspect of the invention, the end portions of the two conducting wires are first brought into contact with the conductive coating material stored in the insulating cap, the insulating cap is shrunk by heating, and the conductive coating material is hardened. Thus, the end portions are joined together through a single continuous process. Thus, the number of processes is significantly reduced as compared with the conducting wire end portion joining method according to the related art. The conducting wire end portion joining structure according to the second aspect is formed by bringing the end portions of the two conducting wires into contact with the conductive coating material and then hardening the conductive coating material. Thus, the height of the conducting wire end portion joining structure according to the second aspect is significantly lower than that of the conducting wire end portion joining structure according to the related art. As a result, the height of the joint portion at the coil ends is also lower, and consequently, the physical size of the coils is smaller than that of the conducting wire end portion joining structure according to the related art.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
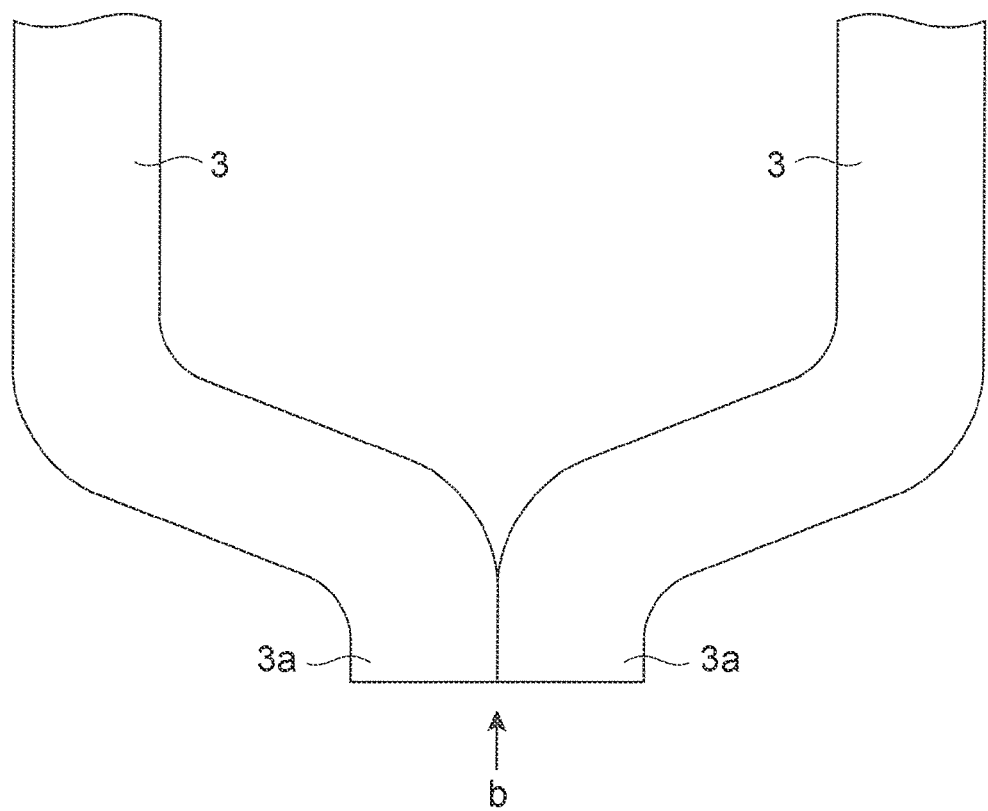
FIG. 1A is a front view illustrating a first step in a conducting wire end portion joining method of the invention.

Hereinafter, a conducting wire end portion joining method and a conducting wire end portion joining structure according to example embodiments of the invention will be described with reference to the accompanying drawings. The winding wire in the drawings is a flat wire, but the winding wire used in the conducting wire end portion joining method according to the invention may of course be a round wire having a circular cross-section.

Figure 1B:
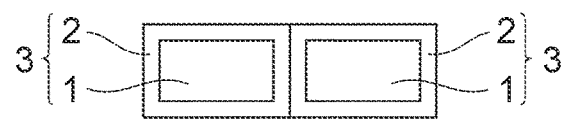
FIG. 1B is an arrow view taken in the direction of an arrow b in FIG. 1A, FIG. 1B illustrating the first step in the conducting wire end portion joining method of the invention.
Figure 2:
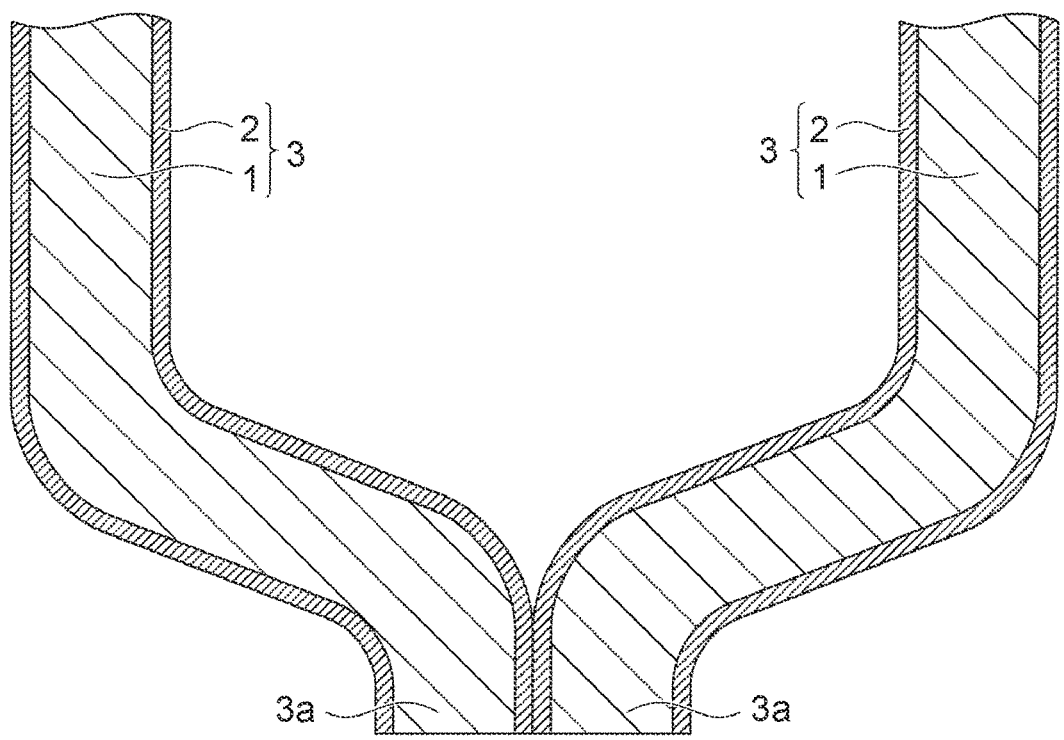
FIG. 2 is a view illustrating the first step continuing on from FIGS. 1A and 1B.
Figure 2:
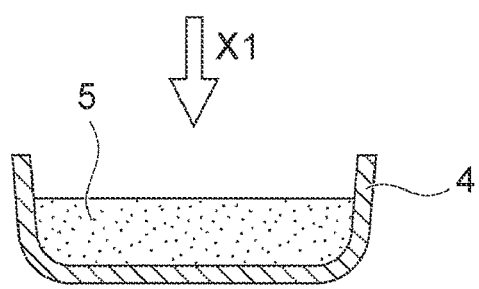
Figure 3:
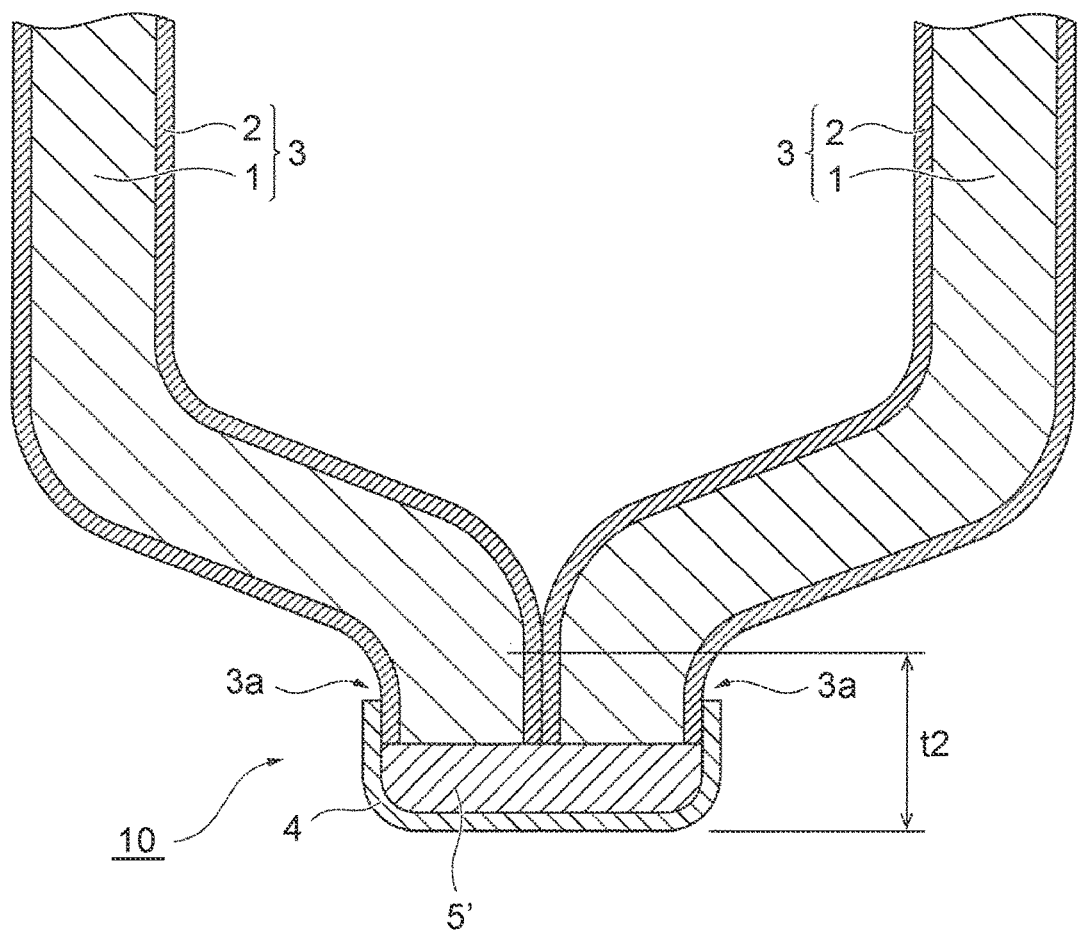
FIG. 3 is a view illustrating a second step in the conducting wire end portion joining method, FIG. 3 illustrating a conducting wire end portion joining structure of the invention.
Figure 4A:
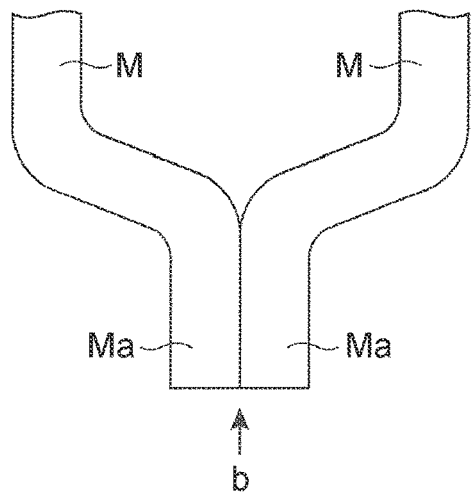
FIG. 4A is a view illustrating a conducting wire end portion joining method according to related art.
Figure 4B:
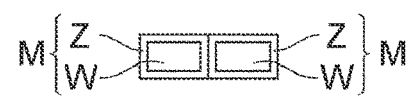
FIG. 4B is an arrow view taken in the direction of an arrow b in FIG. 4A.
Figure 4C:
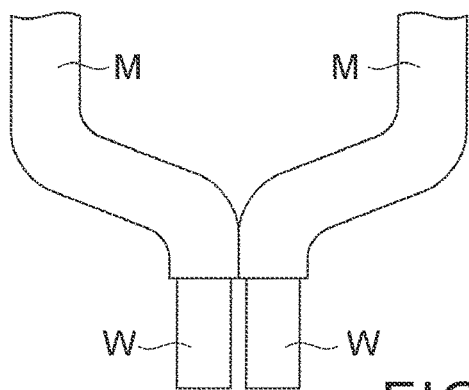
FIG. 4C is a view illustrating the conducting wire end portion joining method according to the related art, FIG. 4C illustrating a process subsequent to that in FIG. 4A.
Figure 4D:
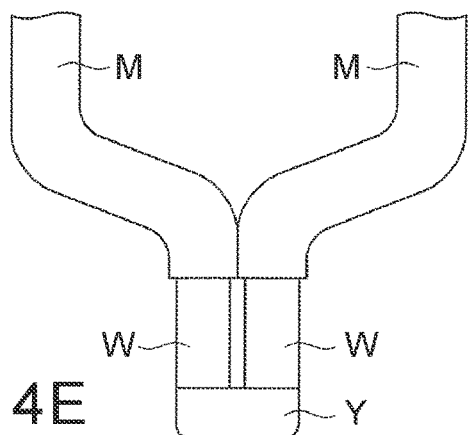
FIG. 4D is a view illustrating the conducting wire end portion joining method according to the related art, FIG. 4D illustrating a process subsequent to that in FIG. 4C.
Figure 4E:
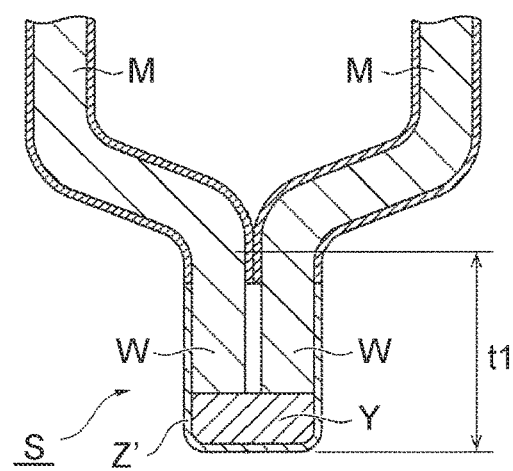
FIG. 4E is a view illustrating the conducting wire end portion joining method according to the related art, FIG. 4E illustrating a process subsequent to that in FIG. 4D.

Conducting Wire End Portion Joining Method and Conducting Wire End Portion Joining Structure According to Example Embodiments FIG. 1A is a front view illustrating a first step in the conducting wire end portion joining method of the invention. FIG. 1B is an arrow view taken in the direction of an arrow b in FIG. 1A, and FIG. 1B illustrates the first step in the conducting wire end portion joining method of the invention. FIG. 2 is a view illustrating the first step continuing on from FIGS. 1A and 1B. FIG. 3 is a view illustrating a second step in the conducting wire end portion joining method of the invention, and FIG. 3 illustrates a conducting wire end portion joining structure of the invention.

First, end portions 3a of two winding wires 3 are adjoined to each other at coil ends, as shown in FIG. 1.

Each of the winding wires 3 includes a conducting wire 1 (a flat conducting body) having a rectangular cross-section, and an insulation coating 2 formed around the conducting wire 1.

The conducting wire 1 is made of oxygen-free copper or tough-pitch copper.

The insulation coating 2 is made of a highly heat resistant thermosetting resin, such as polyimide (PI) or polyamide-imide (PAI), or is made of a thermoplastic resin, such as polyether ether ketone (PEEK), polyphenylene sulfide (PPS), or a fluororesin.

Next, as shown in FIG. 2, the end portions 3a of the two adjoined conducting wires 1 are dipped (in a direction X1) in a conductive coating material 5 stored in an insulating cap 4 such that the end portions 3a are brought into contact with the conductive coating material 5 (the first step has been described so far).

The insulating cap 4 is made of fluorinated ethylene propylene (FEP) that is a copolymer of tetrafluoroethylene and hexafluoropropylene, or made of polytetrafluoroethylene (PTFE). FEP and PTFE are highly heat resistant and shrink when heated.

The conductive coating material 5 is a copper paste (in which copper is dispersed in a thermosetting resin) or a silver paste (in which silver is dispersed in a thermosetting resin). Each of the copper paste and the silver paste has an electrical resistance close to that of copper.

The end portions of the two winding wires 3 (the conducting wires 1) are adjoined to each other, and then brought into contact with the conductive coating material 5 stored in the insulating cap 4. Subsequently, the insulating cap 4 is shrunk by being heated with, for example, a heater (not shown), so that the shrunken insulating cap 4 is fixed around the insulation coatings 2 of the end portions 3a of the two winding wires 3, as shown in FIG. 3.

The conducting wires 1 of the two winding wires 3 are conductively connected together via the hardened conductive coating material 5', so that the end portions 3a of the conducting wires 1 are joined together to form a conducting wire end portion joining structure 10 (the second step).

The conducting wire end portion joining method according to the related art requires three different processes, that is, a process of stripping off coatings of end portions of winding wires, a welding process, and a process of forming an insulation coating. In contrast to this, according to the illustrated conducting wire end portion joining method in the present embodiment, the end portions 3a of the two winding wires 3 are joined together through a single continuous process in which the end portions 3a of the two winding wires 3 are brought into contact with the conductive coating material 5 and heating is performed. Thus, the number of processes is significantly reduced as compared with the conducting wire end portion joining method according to the related art. As a result of the reduction in the number of processes, equipment costs are also significantly reduced.

The conducting wire end portion joining structure 10 is formed by bringing the end portions 3a of the two conducting wires 1 into contact with the conductive coating material 5 and then hardening the conductive coating material 5. Thus, the height (height t2 in FIG. 3) of the conducting wire end portion joining structure 10 is significantly lower than that of the conducting wire end portion joining structure according to the related art. Because the height of a joint portion at the coil ends is lower, the physical size of the coils is smaller than that of the conducting wire end portion joining structure according to the related art.

A specific embodiment will be described below. In this specific embodiment, flat wires (with sectional dimensions of 1.7 mm×3.0 mm) each including a conducting wire made of oxygen-free copper and an insulation coating made of polyamide-imide are used. In this specific embodiment, a conductive coating material made of a silver paste is stored in a shrinkable tube made of FEP. Then, end portions of the two flat wires are dipped into the conductive coating material, and the tube is shrunk by being heated at a temperature of 210° C., so that the tube is fixed around the end portions. In this way, the end portions of the winding wires are joined together.

Heretofore, one example embodiment of the invention has been described in detail with reference to the drawings, but the specific structure is not limited to that in this example embodiment. The invention also includes design modifications and the like within the scope of the invention.

What is claimed is:

1. A conducting wire end portion joining method for conductively joining together end portions of conducting wires each covered with an insulation coating, the conducting wire end portion joining method comprising:

aligning end portions of conducting wires with end portions of insulation coatings of the conducting wires while adjoining the insulation coatings of side surfaces of the end portions of two winding wires, and bringing end surfaces of the end portions of the conducting wires of the two winding wires into contact with a conductive coating material stored in an insulating cap having a property of shrinking when heated; and shrinking the insulating cap by heating to fix the shrunken insulating cap around the insulation coatings of the end portions of the two winding wires, and joining together the end portions of the two winding wires by conductively connecting the conducting wires of the two winding wires via the hardened conductive coating material.

2. The conducting wire end portion joining method according to claim 1, wherein the conductive coating material contains a thermosetting resin.

3. The conducting wire end portion joining method according to claim 1, wherein:

the conducting wires are made of copper; and the conductive coating material is a material in which copper or silver is dispersed in a thermosetting resin.

4. The conducting wire end portion joining method according to claim 1, wherein the insulating cap is made of fluorinated ethylene propylene that is a copolymer of tetrafluoroethylene and hexafluoropropylene.

5. The conducting wire end portion joining method according to claim 1, wherein the insulating cap is made of polytetrafluoroethylene.

6. The conducting wire end portion joining method according to claim 1, wherein each of the conducting wires is a flat conducting body, and the end portions of the conducting wires are end portions of the flat conducting bodies of coil ends of a motor.

7. The conducting wire end portion joining method according to claim 1, wherein the side surfaces are directly adjacent to the end surfaces of the end portions.

8. The conducting wire end portion joining method according to claim 1, wherein the insulation coatings are formed around the conducting wires in the end surfaces of the end portions of the conducting wires of the two winding wires.

9. A conducting wire end portion joining structure comprising:

two winding wires; and an insulating cap, wherein end portions of conducting wires of the two winding wires are conductively joined together, each of the conducting wires being covered with an insulation coating, insulation coatings of side surfaces of end portions of two winding wires are adjoined while the end portions of the conducting wires are aligned with end portions of the insulation coatings, end surfaces of the end portions of the conducting wires of the two winding wires are in contact with a conductive coating material in the insulating cap, and the conducting wires of the two winding wires are conductively connected together via the conductive coating material, and the insulating cap is fixed around the insulation coatings of the end portions of the two winding wires.

10. The conducting wire end portion joining structure according to claim 9, wherein the conductive coating material contains a thermosetting resin.

11. The conducting wire end portion joining structure according to claim 9, wherein:

the conducting wires are made of copper; and the conductive coating material is a material in which copper or silver is dispersed in a thermosetting resin.

12. The conducting wire end portion joining structure according to claim 9, wherein the insulating cap is made of fluorinated ethylene propylene that is a copolymer of tetrafluoroethylene and hexafluoropropylene.

13. The conducting wire end portion joining structure according to claim 9, wherein the insulating cap is made of polytetrafluoroethylene.

14. The conducting wire end portion joining structure according to claim 9, wherein each of the conducting wires is a flat conducting body, and the end portions of the conducting wires are end portions of the flat conducting bodies of coil ends of a motor.

15. The conducting wire end portion joining structure according to claim 9, wherein the side surfaces are directly adjacent to the end surfaces of the end portions.

16. The conducting wire end portion joining structure according to claim 9, wherein the insulation coatings are formed around the conducting wires in the end surfaces of the end portions of the conducting wires of the two winding wires.

* * * * *